United States Patent
Yang

(10) Patent No.: US 7,369,194 B2
(45) Date of Patent: May 6, 2008

(54) FRINGE FIELD SWITCHING LIQUID CRYSTAL DISPLAY

(75) Inventor: Chiu-Lien Yang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 365 days.

(21) Appl. No.: 10/996,919

(22) Filed: Nov. 24, 2004

(65) Prior Publication Data

US 2005/0128414 A1    Jun. 16, 2005

(30) Foreign Application Priority Data

Dec. 13, 2003    (CN) .................. 2003 1 01174229

(51) Int. Cl.
*G02F 1/1335*    (2006.01)
*G02F 1/1343*    (2006.01)

(52) U.S. Cl. .................. 349/106; 349/114; 349/141

(58) Field of Classification Search .............. 349/141, 349/113–114, 106
See application file for complete search history.

(56) References Cited

U.S. PATENT DOCUMENTS

| | | | |
|---|---|---|---|
| 6,404,470 B1 | 6/2002 | Kim et al. | |
| 6,501,521 B2* | 12/2002 | Matsushita et al. | 349/106 |
| 6,542,209 B2 | 4/2003 | Kim et al. | |
| 6,583,842 B2 | 6/2003 | Hong et al. | |
| 6,611,310 B2* | 8/2003 | Kurahashi et al. | 349/141 |
| 6,642,985 B2 | 11/2003 | Kim et al. | |
| 6,650,385 B1* | 11/2003 | Liu | 349/113 |
| 6,914,655 B2* | 7/2005 | Yamazaki et al. | 349/141 |
| 7,190,419 B2* | 3/2007 | Park | 349/43 |
| 2002/0180919 A1* | 12/2002 | Maeda et al. | 349/141 |
| 2003/0218703 A1* | 11/2003 | Huh et al. | 349/106 |

* cited by examiner

*Primary Examiner*—Toan Ton
(74) *Attorney, Agent, or Firm*—Wei Te Chung

(57) ABSTRACT

A fringe field switching liquid crystal display (100) includes a first substrate (101) and a second substrate (110) disposed opposite each other and spaced apart a predetermined distance. A liquid crystal layer (120) is interposed between the first substrate and the second substrate. A plurality of pixel electrodes (104) is formed on the first substrate, the pixel electrodes being parallel to each other. A counter electrode (102) is formed between the first substrate and the pixel electrodes, the counter electrode being overlapped partially by the pixel electrodes. A transparent insulating layer (103) is disposed between the counter electrode and the pixel electrodes. The pixel electrodes are used to reflect light beams. The fringe field switching liquid crystal display can thus utilize ambient reflected light as well as light provided by a backlight, so that the fringe field switching liquid crystal display has low power consumption.

12 Claims, 4 Drawing Sheets

FRINGE FIELD SWITCHING LIQUID CRYSTAL DISPLAY

BACKGROUND OF THE INVENTION

1. Field of the Invention

The present invention relates to a fringe field switching liquid crystal display (FFS-LCD), and especially to a transflective mode FFS-LCD providing low power consumption.

2. Description of Prior Art

The in-plane switching liquid crystal display (IPS-LCD) has been developed in order to improve on the narrow viewing angle of the standard twisted nematic liquid crystal display (TN-LCD). The IPS-LCD has a counter electrode and a plurality of pixel electrodes all disposed on a same substrate of two opposite substrates, for driving liquid crystal molecules that are disposed between the substrates. The resulting electric field is substantially planar and parallel to a surface of said same substrate. This structure provides an improved viewing angle.

However, the counter electrode and pixel electrodes are formed of opaque metals, giving the IPS-LCD a low aperture ratio and low transmittance. Thus the so-called fringe field switching liquid crystal display (FFS-LCD) has been developed in order to improve on the aperture ratio and transmittance of IPS-LCDs. The FFS-LCD is characterized by the liquid crystal molecules being driven by a fringe electric field.

Referring to FIG. 7, this is a cross-sectional representation of an FFS-LCD as disclosed in U.S. Pat. No. 6,642,985 issued on Nov. 4, 2003. The FFS-LCD 10 is a transmissive mode LCD, which utilizes a backlight as a light-illuminating section. The FFS-LCD 10 comprises an upper substrate 11 and a lower substrate 1 disposed opposite to each other and spaced apart a predetermined distance. A liquid crystal layer 20 having a plurality of liquid crystal molecules 20a is disposed between the upper and lower substrates 11, 1. A counter electrode 2 and pixel electrodes 4 are disposed on the lower substrate 1, with an insulating layer 3 interposed between the counter and pixel electrodes 2, 4. A lower alignment film 5 is disposed on an inner surface of the lower substrate 1. A color filter 14 is disposed on an undersurface of the upper substrate 11. The color filter 14 comprises a black matrix 12, and a color resin layer 13 having Red, Green and Blue segments. An indium tin oxide (ITO) layer 30 and an upper alignment film 15 are disposed at an underside of the color filter 14, in that order from top to bottom.

The counter electrode 2 is essentially planar, and each pixel electrode 4 is comb-shaped. The counter electrode 2 and the pixel electrode 4 are transparent conductors, which are made of a material such as ITO. Therefore, the aperture ratio of the FFS-LCD 10 is improved compared to that of an IPS-LCD. The pixel electrode 4 partially overlaps the counter electrode 2, and a distance between the counter electrode 2 and the pixel electrode 4 is less than that between the lower substrate 1 and the upper substrate 11. When the FFS-LCD 10 is driven, a fringe electric field is formed at upper portions of the counter electrode 2 and the pixel electrode 4. The liquid crystal molecules 20a disposed over the counter and pixel electrodes 2, 4 are all driven, thus giving the FFS-LCD 10 improved transmittance compared to that of an IPS-LCD.

However, the FFS-LCD 10 is a transmissive mode LCD, in which a backlight is utilized as a light-illuminating section. The backlight typically consumes 50% or more of the total power consumed by the FFS-LCD 10.

It is desired to provide an FFS-LCD that can solve the above-mentioned high power consumption problem.

SUMMARY OF THE INVENTION

An object of the present invention is to provide a fringe field switching liquid crystal display which has low power consumption.

To achieve the above object, a fringe field switching liquid crystal display of the present invention includes a first substrate and a second substrate disposed opposite each other and spaced apart a predetermined distance. A liquid crystal layer is interposed between the first substrate and the second substrate. A plurality of pixel electrodes is formed on the first substrate, the pixel electrodes being parallel to each other. A counter electrode is formed between the first substrate and the pixel electrodes, the counter electrode being overlapped partially by the pixel electrodes. A transparent insulating layer is disposed between the counter electrode and the pixel electrodes. The pixel electrodes are used to reflect light beams. The fringe field switching liquid crystal display can thus utilize ambient reflected light as well as light provided by a backlight, so that the fringe field switching liquid crystal display has low power consumption.

Other objects, advantages, and novel features of the present invention will become more apparent from the following detailed description when taken in conjunction with the accompanying drawings, in which:

BRIEF DESCRIPTION OF THE DRAWINGS 1 is a schematic, cross-sectional view of part of an FFS-LCD according to a first embodiment of the present invention;

DETAILED DESCRIPTION OF THE INVENTION

Figure 1:
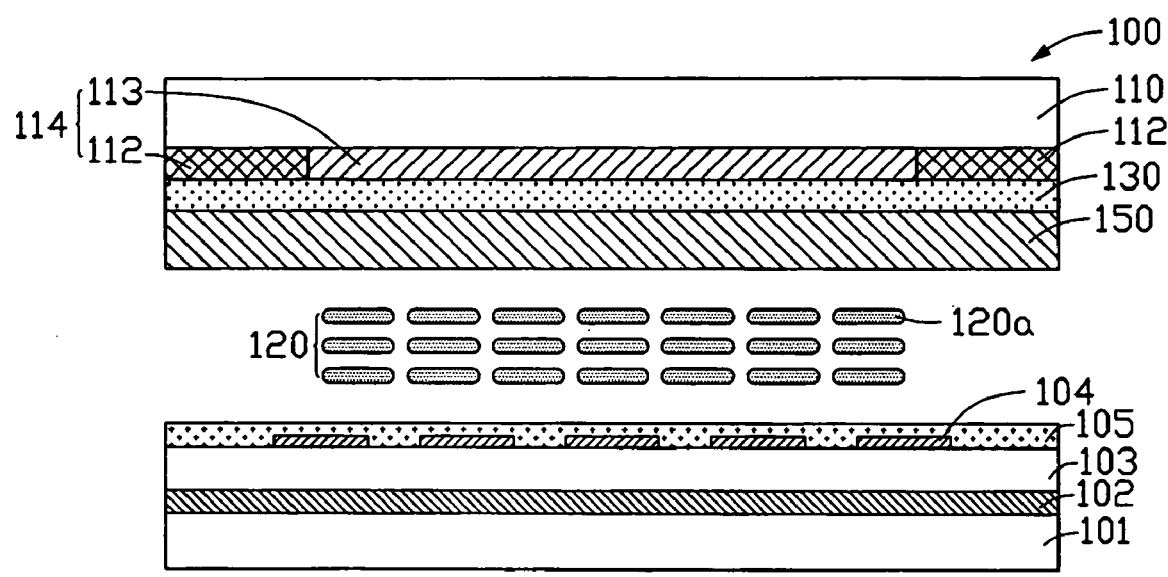

FIG. 1 is a schematic, cross-sectional view of a fringe field switching liquid crystal display (FFS-LCD) 100 according to the first embodiment of the present invention. The FFS-LCD 100 comprises a first substrate 101, a second substrate 110, and a liquid crystal layer 120 having a plurality of liquid crystal molecules 20a. The first substrate 101 and the second substrate 110 are spaced apart from each other, and the liquid crystal layer 120 is disposed therebetween. The first substrate 101 and the second substrate 110 are made of glass. Alternatively, the first substrate 101 and the second substrate 110 can be made of silicon dioxide ($SiO_2$).

A plurality of gate bus lines (not shown) and a plurality of data bus lines (not shown) are cross-arranged on an inner surface of the first substrate 101. A plurality of thin film transistors (not shown) is disposed at intersections of the gate bus lines and the data bus lines. A counter electrode 102 and a plurality of pixel electrodes 104 are disposed on the first substrate 101, with a transparent insulating layer 103 interposed between them. An alignment film 105 is formed between the liquid crystal layer 120 and the first substrate 101. A color filer 114, an insulating layer 130 and an alignment film 150 are formed on an underside of the second substrate 110, in that order from top to bottom. Two polarizers (not shown) are formed on the first substrate 101 and the second substrate 110 respectively. The polarizing axes of the polarizers are perpendicular to each other.

The alignment films 105, 150 are horizontal alignment layers with a low pretilt angle below 3°. The counter electrode 102 is plate-shaped, and each pixel electrode 104 is strip-shaped. The pixel electrodes 104 partially overlap the counter electrode 102, and a distance between the counter electrode 102 and the pixel electrodes 104 is less than that between the first substrate 101 and the second substrate 110. The counter electrode 102 is made of a transparent conductor, such as indium tin oxide (ITO) or indium zinc oxide (IZO). The pixel electrodes 104 are made of a metallic material having high reflectivity, such as aluminum (Al), silver (Ag), etc.

The color filter 114 comprises a black matrix 112, and a color resin layer 113 having Red, Green and Blue segments. The black matrix 112 is disposed between the segments of the color resin layer 113. The black matrix 112 is used to prevent light beams from leaking, and to protect the thin film transistors from damage. The insulating layer 130 is transparent, and is used to prevent electrostatic buildup and eliminate afterimage. The transparent insulating film 103 is made of $SiO_2$ or silicon nitride (SiNx).

Because the pixel electrodes 104 have high reflectivity, they serve as reflective electrodes for reflecting light beams coming from the ambient environment. The counter electrode 102 is transparent so that light beams from a backlight (not shown) can pass through the counter electrode 102 and the liquid crystal layer 120. When no voltage is applied to the counter electrode 102 and pixel electrodes 104, the liquid crystal molecules 120a are arranged substantially parallel to the first substrate 101 and the second substrate 110. Long axes of the liquid crystal molecules 120a are parallel to the pixel electrodes 104. The state of polarization of the light beams is not changed when the light beams pass through the liquid crystal layer 120. Therefore the light beams can pass through the polarizer of the second substrate 110. As a result, the FFS-LCD 100 is in a dark state. When a voltage is applied to the counter electrode 102 and the pixel electrodes 104, a fringe electric field having horizontal components is produced therebetween. The long axes of the liquid crystal molecules 120a are parallel to the fringe field. The polarization state of the light beams is changed when the light beams pass through the liquid crystal layer 120. Therefore the light beams cannot pass through the polarizer of the second substrate 110. As a result, the FFS-LCD 100 is in a white state.

The pixel electrodes 104 can reflect ambient light for display, and the counter electrode 102 can transmit light beams from the backlight for display. Therefore, the FFS-LCD 100 is a transflective mode liquid crystal display. Because the transflective mode LCD can make use of both internal and external light sources, it can be operated in bright ambient light with low power consumption. Further, the FFS-LCD 100 has a wide viewing angle.

Figure 2:
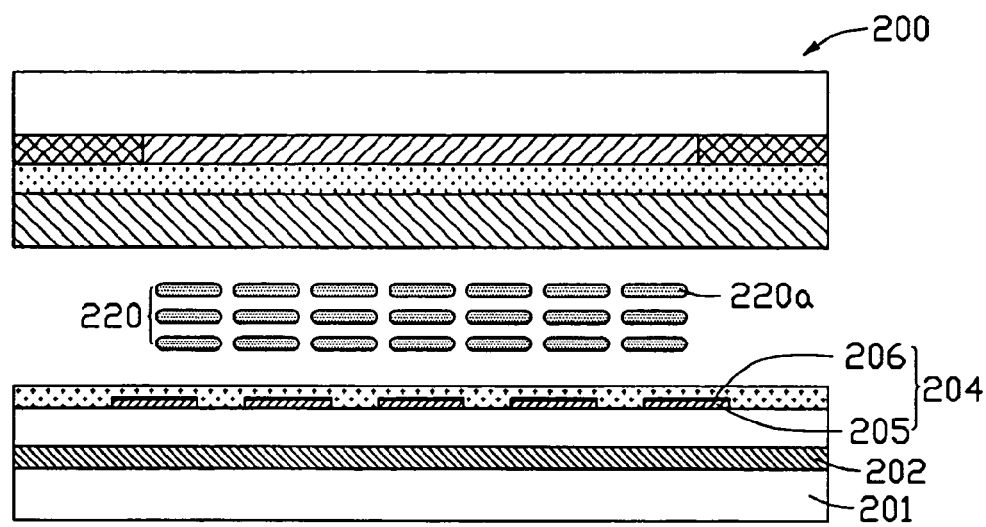
FIG. 2 is a schematic, cross-sectional view of part of an FFS-LCD according to a second embodiment of the present invention.

Referring to FIG. 2, this is a schematic, cross-sectional view of an FFS-LCD 200 according to the second embodiment of the present invention. The FFS-LCD 200 is similar to the FFS-LCD 100 of the first embodiment, and comprises a first substrate 201, a plurality of pixel electrodes 204, a counter electrode 202 and a liquid crystal layer 220 having a plurality of liquid crystal molecules 220a. Each pixel electrode 204 includes an electrode layer 205, and a reflective layer 206 formed on the electrode layer 205. The electrode layer 205 is made of a metallic material having high reflectivity, such as Al or Ag. Alternatively, the electrode layer 205 can be a transparent conductive film, such as one made from indium tin oxide or indium zinc oxide; and the reflective layer 206 can be made of a metallic material having high reflectivity, such as Al or Ag. When a voltage is applied to the pixel electrodes 204 and the counter electrode 202, a fringe electric field having horizontal components parallel to the first substrate 201 is produced. The liquid crystal molecules 220a are twisted such that the long axes thereof coincide with the direction of the electric field. The reflective layer 206 reflects ambient light beams for display.

Figure 3:
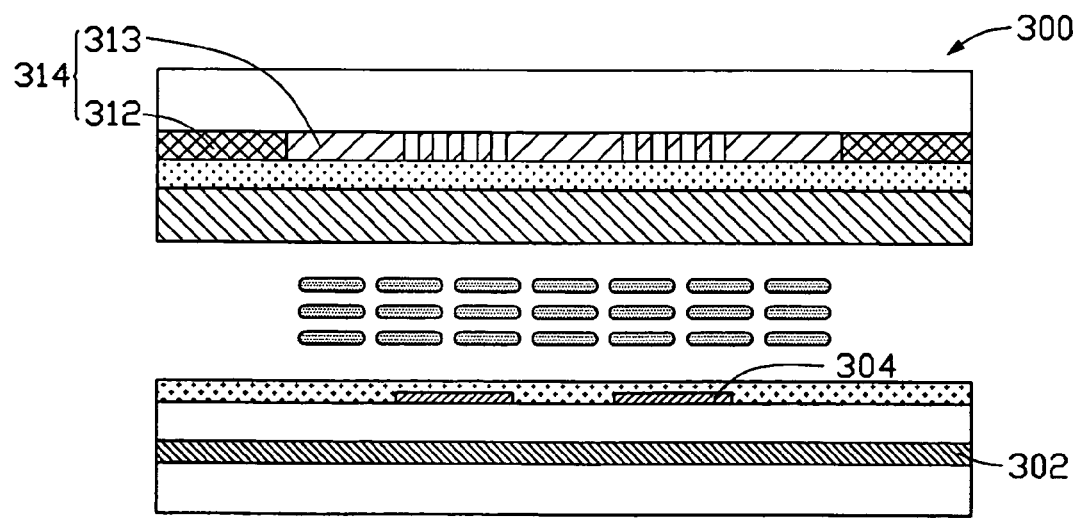
FIG. 3 is a schematic, cross-sectional view of part of an FFS-LCD according to a third embodiment of the present invention.
Figure 4:
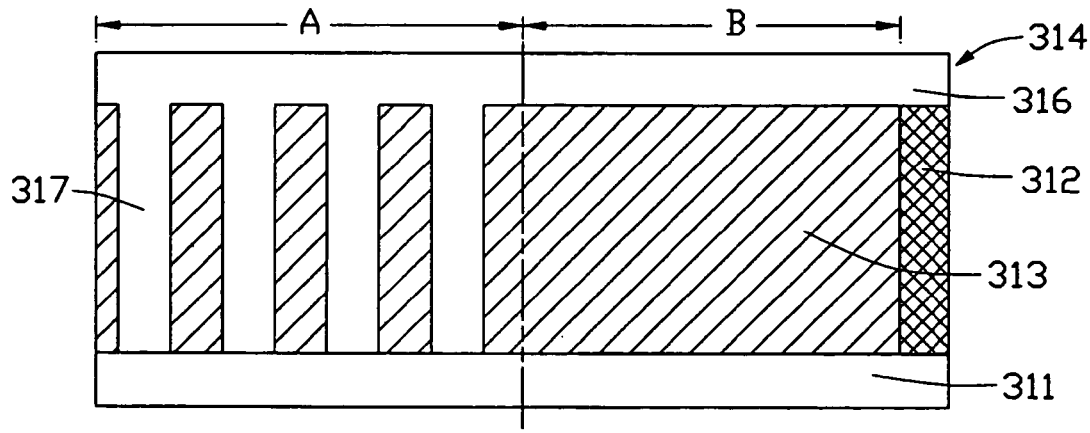
FIG. 4 is an enlarged view corresponding to part of a color filter shown in the FFS-LCD of FIG. 3.

Referring to FIG. 3, this shows a schematic, cross-sectional view of an FFS-LCD 300 according to the third embodiment of the present invention. The FFS-LCD 300 is the same as the FFS-LCD 100 of the first embodiment, except that the FFS-LCD 300 has a color filter 314 instead of the color filter 114. FIG. 4 is an enlarged view of part of the color filter 314 shown in FIG. 3. The color filter 314 includes a transparent substrate 311, and a black matrix 312, a color resin layer 313 and a transparent protection film 316 that are all formed on the transparent substrate 311. The color resin layer 313 comprises a plurality of RGB (Red Green Blue) segments. Each RGB segment comprises a Red (R) segment, a Green (G) segment and a Blue (B) segment. The RGB segments are arranged in a regular repeating array on the transparent substrate 311. The black matrix 312 is disposed between the RGB segments, for preventing light beams from leaking and for protecting the thin film transistors from damage. The transparent protection layer 316 is coated on the color resin layer 313 and the black matrix 312, and is made of $SiO_2$ or SiNx. Each RGB segment of the color resin layer 313 is divided into a plurality of first sections A and a plurality of second sections B, corresponding to the pixel electrodes 304 and to parts of the counter electrode 302 that are not overlapped by the pixel electrodes 304, respectively. A thickness of the color resin layer 313 of each first section A is equal to that of each second section B. The first section A defines a plurality of holes 317 therein, which are areas having no color resin and which are filled with the transparent protection layer 316. Portions of the first section A corresponding to the holes 317 are non-color portions, and the other portions of the first section A are color portions. The combined area of the non-color portions is equal to that of the color portions.

Ambient light beams pass through the first section A of the color resin layer 313, are reflected by the pixel electrodes 304, and then pass through the first section A again. Light beams from the backlight pass through the counter electrode 302 and second section B of the color resin layer 313 in a single traverse. Therefore, the distance traversed by the light beams passing through the first section A is twice than that of the second section B. The first section A is divided into the color portions and the non-color portions; thus the color characteristic of the light beams of the first section A is substantially the same as the color characteristic of the light beams of the second section B. In other words, the color saturation of the light beams emitting from the first section A is substantially the same as the color saturation of the light beams emitting from the second section B.

Figure 5:
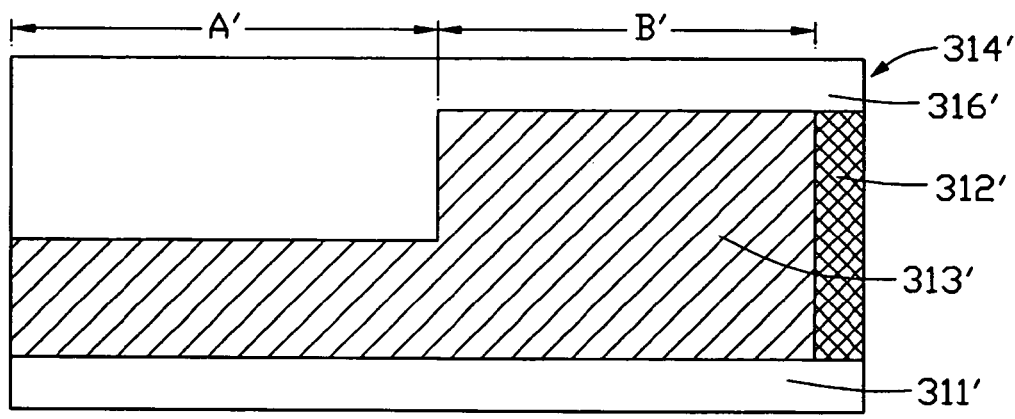
FIG. 5 is similar to FIG. 4, but shows an alternative color filter according to the present invention.

FIG. 5 illustrates an alternative color filter 314' according to the present invention. The color filter 314' is similar to the color filter 314, and includes a transparent substrate 311', a black matrix 312', a color resin layer 313' and a transparent protection layer 316'. The color resin layer 313' comprises a plurality of RGB segments. A thickness of the color resin layer 313' in each first section A' is half that of the color resin layer 313' in each second section B'.

Figure 6:
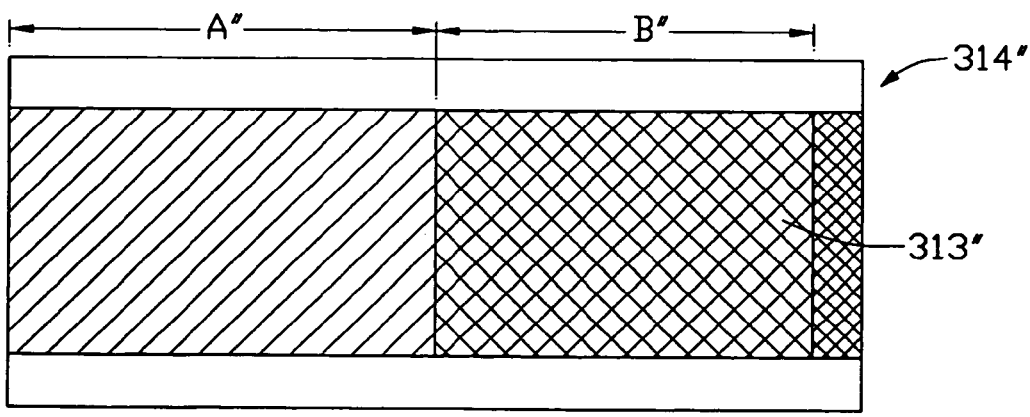
FIG. 6 is similar to FIG. 4, but shows a further alternative color filter according to the present invention.
Figure 7:
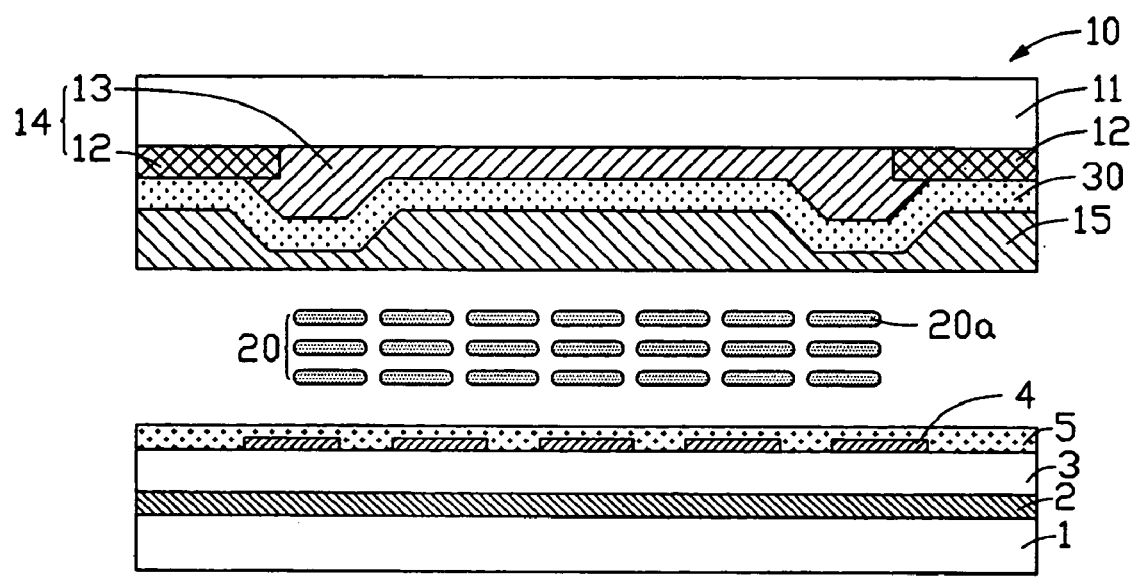
FIG. 7 is a schematic, cross-sectional view of part of a conventional FFS-LCD.

FIG. 6 illustrates a further alternative color filter 314" according to the present invention. The color filter 314" is similar to the color filter 314'. A thickness of a color resin layer 313" in each first section A" is equal to that of the color resin layer 313" in each second section B". A concentration of color resin in the first section A" is half of a concentration of color resin in the second section B".

The FFS-LCD of the present invention is a transflective mode liquid crystal display, which can make use of both internal and external light sources. Therefore, the FFS-LCD can be operated in bright ambient light with low power consumption. Furthermore, the FFS-LCD has a wide viewing angle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A fringe field switching liquid crystal display comprising:
   a first substrate and a second substrate disposed opposite each other and spaced apart a predetermined distance;
   a liquid crystal layer interposed between the first substrate and the second substrate;
   a plurality of pixel electrodes formed on the first substrate, the pixel electrodes being parallel to each other and being used to reflect light beams;
   a counter electrode formed between the first substrate and the pixel electrodes, the counter electrode being overlapped partially by the pixel electrodes; and
   a color filter having a color resin layer containing color resin;
   wherein the color resin layer comprises RGB (Red Green Blue) segments, each RGB segment comprises at least one first section and at least one second section, said at least one first section corresponds to a respective one of the pixel electrodes, and said at least one second section corresponds to a respective portion of the counter electrode which is not overlapped by said respective one of the pixel electrodes.

2. The fringe field switching liquid crystal display as claimed in claim 1, wherein the pixel electrodes comprise aluminum.

3. The fringe field switching liquid crystal display as claimed in claim 1, wherein the pixel electrodes comprise silver.

4. The fringe field switching liquid crystal display as claimed in claim 1, wherein each pixel electrode comprises an electrode layer and a reflective layer.

5. The fringe field switching liquid crystal display as claimed in claim 4, wherein the electrode layer comprises aluminum or silver.

6. The fringe field switching liquid crystal display as claimed in claim 4, wherein the electrode layer is made of a transparent conductive material.

7. The fringe field switching liquid crystal display as claimed in claim 6, wherein the reflective layer comprises silver or aluminum.

8. The fringe field switching liquid crystal display as claimed in claim 1, wherein the counter electrode is made of indium tin oxide or indium zinc oxide.

9. The fringe field switching liquid crystal display as claimed in claim 1, wherein the counter electrode is substantially planar.

10. The fringe field switching liquid crystal display as claimed in claim 1, wherein said at least one first section has a plurality of holes, and an area of the holes is substantially equal to an area of the color resin in said at least one first section.

11. The fringe field switching liquid crystal display as claimed in claim 1, wherein a thickness of the color resin layer at said at least one first section is substantially half a thickness of the color resin layer at said at least one second section.

12. The fringe field switching liquid crystal display as claimed in claim 1, wherein a thickness of the color resin layer at said at least one first section is substantially equal to a thickness of the color resin layer at said at least one second section, and a concentration of the color resin in said at least one first section is substantially half a concentration of the color resin in said at least one second section.

* * * * *